June 3, 1952
P. G. FRERER
2,599,101
HEATING CONTROL APPARATUS
Filed Dec. 19, 1947
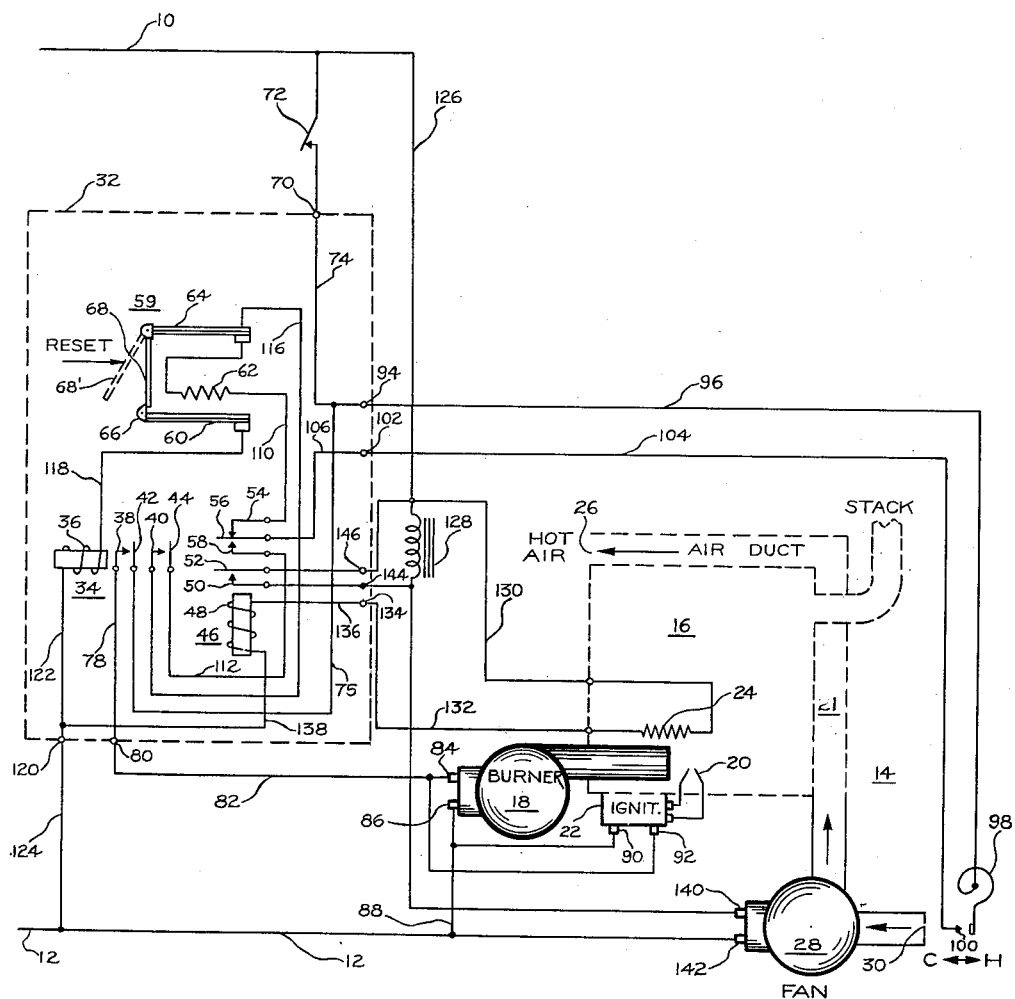
Inventor
PAUL G. FRERER
By George V. Eltgroth
Attorney Patented June 3, 1952

2,599,101

UNITED STATES PATENT OFFICE 2,599,101

HEATING CONTROL APPARATUS

Paul G. Frerer, Baltimore, Md., assignor to Bendix Aviation Corporation, Baltimore, Md., a corporation of Delaware Application December 19, 1947, Serial No. 792,762

3 Claims. (Cl. 236—9)

This invention relates to apparatus for controlling automatically fired heating installations and, more particularly, to such installations in which provisions have been included for forced circulation of the heat exchanging medium.

At the present time, automatically controlled oil-fired heating installations are widely employed both in the domestic and commercial fields. It was early found that when such a system was employed in forced-air heating installations the energization of the circulating fan simultaneously with the energization of the burner motor resulted in the establishment of cold air flow from the warm air register. To avoid objections raised to this characteristic of operation by the public, a temperature responsive switch was located within the furnace plenum which governed the operation of the circulating fan permitting such operation only when the phenum temperature exceeded a preset value. Most of these automatically fired heating installations were already provided with a combustion responsive circuit controller intended to disable a slow acting safety switch governing burner operation after combustion had been successfully and safely established. However, the operation of this switch continued to be applied solely to the monitoring of burner starting conditions while a second device was used for governing fan operation.

It is an object of the present invention to provide a burner controlled system in which the combustion safety monitoring mechanism also governs the operation of an associated circulator or circulation controlling device.

Still another object of the invention is to provide an improved heating system having an associated circulation controlling device with an improved arrangement for delaying the establishment of circulation after the initiation of combustion and for delaying the interruption of circulation after the cessation of combustion.

Other objects and advantages of the invention will in part be described and in part be obvious when the following specification is read in conjunction with:

The single figure drawing which is a schematic illustration of a system incorporating the invention.

Referring now to the drawing, there is shown a hot air furnace 14 having a combustion chamber 16 surrounded by a heat exchanging duct 21. A burner 18 of the conventional gun type is situated with the delivery end of the blast tube located within the combustion chamber 16. It is to be understood that the burner 18 has associated therewith a fuel supply tank and connecting lines forming no part of the invention which have been omitted from the showing in the interest of simplicity. The burner 18 is provided with power input terminals 84 and 86 for energization of the burner motor, and the combustible mixture at the delivery end of the blast tube is ignited by a pair of spaced electrodes 20 situated adjacent thereto and connected to the terminals of the high voltage secondary of an ignition transformer 22 whose primary terminals 90 and 92 are connected respectively to burner motor terminals 84 and 86, so that whenever the burner 18 is energized an igniting spark or arc plays between electrodes 20.

Electric power for the operation of the system is derived from the mains connections 10 and 12 which are connected with the burner 18 and a fan motor 28 through a control unit 32 by connections to be further described.

The control unit 32 is conventionally a unitary article of manufacture separately assembled and sold to the person making the installation of the complete heating system. This control unit includes a mains terminal 70 connected to the mains lead 10 through a normally closed limit switch 72 adapted to open when some selected parameter of furnace operation deviates beyond preset limits. In a hot air furnace, this parameter may be the stack temperature, while in a circulating hot water furnace it may also be the boiler water temperature. The mains terminal 70 is connected within the control unit 32 by leads 74 and 75 with the movable contact 42 of a burner control relay 34. The burner control relay 34 is provided with an operating winding 36 which, when energized, attracts movable contact 42 bringing it into engagement with fixed contact 38 connected with the burner control terminal 80 which is linked by lead 82 with burner motor terminal 84. The energizing circuit for the burner motor 18 is completed by the lead 88 extending between burner motor terminal 86 and the mains lead 12.

The operating winding 36 of burner control relay 34 has one lead connected with mains terminal 120 through a connecting line 122 and thence to mains lead 12 via connection 124. The other end of operating winding 36 is connected by lead 118 with the operating bimetal 60 of a safety switch 59. The operating bimetal 60 has thermally associated therewith an actuating heater 62 whose connections and operation will be further described. The safety switch 59 further includes a compensating bimetal 64 anchored at one end and free to move at the other. A conductive latch bar 68 is pivoted to the movable end of compensating bimetal 64 and biased for clockwise rotation, but is normally restrained from such movement by the latching member 66 located on the free end of operating bimetal 60. Energization of actuating heater 62 deflects the operating bimetal 60 away from compensating bimetal 64 releasing the latch bar 68 which then snaps to the dashed line position indicated at 68'. Because of the bias on latch bar 68, it will remain in this position until reset by a force supplied as indicated.

The operation of the safety switch 59 and burner control relay 34 is influenced by the single-pole double-throw overlapping contacts 54, 56 and 58 operatively associated with the winding 48 of flame relay 46. The safety switch heater 62 is connected between the compensating bimetal 64 and the normally engaged fixed contact 54. The movable contact 56 of flame relay 46 is linked with the thermostat terminal 102 through the connecting lead 106, while an alternative power circuit extends from normally disengaged fixed contact 58 through normally open contacts 40 and 44 of burner relay 34 and lead 116 to the compensating bimetal 64. Thus when burner relay 34 and flame relay 46 are simultaneously energized the heater 62 is disconnected and an energizing circuit extends from thermostat terminal 102 through lead 106, contacts 56, 58, lead 112, contacts 40 and 44, lead 116, safety switch 59 and lead 118 to operating winding 36 and thence through lead 122, mains terminal 120 and lead 124 to the power main 12.

The operating winding 48 of the flame relay 46 is connected to combustion monitor terminal 134 through lead 136 and with mains terminal 120 through lead 138. In addition to the earlier recited flame relay contacts, there is also present a normally open contact pair 50, 52 connected with the circulator controller terminals 144 and 146 shown connected in parallel with a limiting inductance 128. The fan 28 has one power input terminal 142 connected with power main 12 and another power input terminal 140 connected to the power main 10 through the limiting inductance 128 and lead 126. When the flame relay 46 is energized, the circuit across the limiting inductance 128 is closed, removing this impedance from the circuit to permit full speed operation of the fan.

The operation of the flame relay 46 is controlled by temperature responsive resistor 24 located within the combustion chamber 16 adjacent the inner end of the burner blast tube. This resistor may be a semi-conductor consisting essentially of a fired mixture of ball clay and ferric oxide, and characterized by relatively low resistance in the presence of the high temperatures accompanying combustion while presenting substantially an open circuit at normal ambient temperatures. The resistor 24 has one terminal connected with the power main 10 through leads 126 and 130, while its other terminal is linked by lead 132 with combustion monitor terminal 134.

The control unit 32 is provided with a pair of thermostat terminals 94 and 102 connected respectively with mains terminal 70 and movable contact 56 of flame relay 46. Operation of the over-all system is under the control of a thermostat 98 connected to thermostat terminal 94 through a lead 96 and having associated therewith a contact 100 connected with thermostat terminal 102 through the line 104.

Operation

It will be noted that there is a permanently connected power supply for the fan 28 through the limiting reactor 128. This reactor may be located externally of the control unit as illustrated in the drawings or, where the circulator motor requires but low power, may be mounted on the control unit itself. The current normally passing through the inductance 128 operates the fan 28 at a predetermined minimum speed with a resulting constant intake of air at the return inlet 30. The thermostat 98 is located adjacent the return register 30 and responds to the temperature of the return air, which is indicative of the temperature of the space whose condition is being controlled. Upon reaching a predetermined minimum temperature, contact 100 is engaged completing the following energizing circuit for burner relay 34: mains lead 10, limit switch 72, mains terminal 70, connection 74, thermostat terminal 94, lead 96, thermostat 98, contact 100, line 104, thermostat terminal 102, lead 106, central contact 56, back contact 54, heater 62, compensating bimetal 64, latch bar 68, operating bimetal 60, lead 118, operating winding 36, lead 122, mains terminal 120 and lead 124 to mains lead 12. This pulls in the contacts of burner relay 34, closing the following power circuit to the burner motor 18: mains lead 10, limit switch 72, mains terminal 70, leads 74, 75, contact 42, contact 38, burner control terminal 80, line 82, burner terminals 84 and 86, and line 88 to mains lead 12. This sets the burner in operation—the delivered combustible spray being ignited by the spark discharge across electrodes 20. Since the combustion sensing resistor 24 requires an appreciable time to heat up, however, the flame relay 46 remains de-energized for a time.

At the same time that the burner control relay 34 closes the energizing circuit for burner motor 18, an auxiliary power circuit for the burner control relay is partially set up through contacts 40 and 44. This circuit extends from compensating bimetal 64 through lead 116, contacts 40, 44 and lead 112 to the front contact 58 of the single-pole double-throw switch assembly on flame relay 46. Since the contact 58 is at this time disengaged, the auxiliary power circuit does not at once influence the operation of the system. When the resistor 24 has attained a sufficiently high temperature, the current flow through flame relay 46 reaches the operating value and actuates the associating contacts. This closes contacts 56 and 58 while disengaging contact 54 in an overlapping manner. The circuit through the resistor 62 has now been interrupted and an alternative circuit closed extending from thermostat terminal 102 through lead 106, contacts 56, 58, lead 112, contacts 40, 44 and lead 116 to the compensating bimetal 64, and thence through the operating winding of burner control relay 34 to maintain this relay energized. At the same time, contacts 50, 52 close, short-circuiting the limiting inductance 128 to permit operation of the fan 28 at full speed.

Operation of the burner motor 18 continues until the thermostat 98 is satisfied, at which time the thermostat terminal 102 is disconnected at the thermostat from the power supply to de-energize burner control relay 34 and interrupt burner operation, simultaneously opening contacts 40 and 44. The opening of the thermostat, however, is without effect on the combustion sensing energizing circuit for the flame relay 46, which remains in energized condition holding the contacts 50 and 52 closed to maintain the fan 28 at full operating speed until the furnace has cooled, after which the increase in resistance of combustion sensing resistor 24 diminishes the current through the operating winding 48 of flame relay 46 below its holding value, dropping out contacts 50 and 52 to return the fan 28 to slow speed operation.

In the event that combustion is not established, flame relay 46 is not energized, whereby the operating current for burner control relay 34 continues to flow through the safety switch heater 62, warping the operating bimetal 60 away from compensating bimetal 64 to release the latch bar 68 and open the safety switch.

Should combustion fail during a normal operating cycle, the resistor 24 will increase in value ultimately causing the drop-out of flame relay 46 to restore the flow of operating current for burner control relay 34 through safety switch heater 62 which, after a predetermined time, again actuates the safety switch 59 to open circuit position.

Should the heater 62 be burned out, the system cannot be placed in operation, since the starting circuit extends therethrough. It is thus fail-safe in this respect.

If the furnace temperature becomes too high, limit switch 72 opens, de-energizing the burner control relay 34 to discontinue burner operation. However, the fan and combustion sensing circuits are connected to the power mains independently of limit switch 72, whereby flame relay 46 remains energized, holding the high-speed fan circuit closed to assist in cooling the furnace.

Should the thermostat be manually actuated to open circuit and then again to closed circuit position during a normal operating cycle, the burner will not be immediately restored to operation because the flame relay 46 remains energized, holding movable contact 56 in engagement with front contact 58, and out of engagement with back contact 54. Drop-out of the burner control relay 34 opens the auxiliary contacts 40, 44 so that when power is re-applied there is no longer any circuit for the operating current of burner control relay 34. It cannot flow through the safety switch heater 62 because this circuit is open at contact 54, and it cannot flow through the auxiliary power circuit to compensating bimetal 64 because this circuit has been opened at contacts 40, 44. Not until the combustion chamber has cooled sufficiently to drop out the flame relay 46 will another operating cycle be initiated. Dangerous "puffs" are thereby eliminated.

The foregoing has made the essence of the invention clear and there will be apparent to those skilled in the art many modifications and applications which do not distinguish substantially therefrom.

What is claimed and desired to be secured by United States Letters Patent is:

1. In combination, heating apparatus including a combustion chamber and a heat transfer medium circulating system having delivery and return vents, said medium circulating system being in heat exchange relationship with said combustion chamber, a thermally responsive switch adjacent said return vent, an electrically operable burner, a thermistor thermally associated with said combustion chamber, a limit switch, a burner control relay connecting said burner with a power supply, said burner relay having an energizable coil, a safety switch connecting said burner relay coil with said power supply through said limit switch and said return vent circuit controller, an electric actuator for said safety switch receiving energy through said burner relay coil, an electric motor driven fan moving said medium between said return and delivery vents and connected with said power supply through a circuit normally energizing said motor for relatively low speed operation, a flame relay having an operating winding connected with said power supply and with said thermistor associated with said combustion chamber, a set of flame relay controlled contacts disabling said safety switch actuator in the presence of combustion in said chamber, and means completing a high speed power circuit to said motor when said safety switch actuator is disabled.

2. In combination, an electrically operable burner, a combustion chamber having a heat transfer medium in heat exchange relationship therewith, an electric fan for circulating said heat transfer medium, a burner control relay having an energizing coil, a pair of electrical conductors connected to a source of electric energy, a normally conductive limit switch becoming non-conductive when a selected condition varies beyond a predetermined range, a normally closed safety switch, an electrically responsive actuator for opening said safety switch after a pre-determined interval of current flow through said actuator, a flame relay having an energizing coil, a first normally closed switch and a second and a third normally open switch, said last-named switches being controlled by said flame relay and opening and closing, respectively, upon energization of said flame relay, a thermistor associated with said combustion chamber, said thermistor and said flame relay coil being connected in series across said pair of conductors, said thermistor permitting an energizing current to flow through said flame relay coil in response to flame in said combustion chamber, a first power circuit connected across said pair of conductors through said limit switch and including said burner relay coil, said safety switch, said actuator and said first normally closed switch, a second power circuit connected across said pair of conductors through said limit switch and including said burner relay coil, said safety switch, and said second normally open switch, and a fan energizing circuit connected across said pair of conductors independently of said limit switch, said last-named circuit including a current limiting device shunted by said third normally open switch.

3. The combination defined in claim 2, wherein a thermally responsive switch is included in said first and second power circuits.

PAUL G. FRERER.

REFERENCES CITED

The following references are of record in the file of this patent:

UNITED STATES PATENTS

| Number | Name | Date |
|---|---|---|
| 1,648,924 | Warrick | Nov. 15, 1927 |
| 2,143,569 | Nessell | Jan. 10, 1939 |
| 2,160,592 | King | May 30, 1939 |
| 2,167,227 | Wilson | July 25, 1939 |
| 2,230,446 | Baker | Feb. 4, 1941 |